(12) United States Patent
Noma

(10) Patent No.: US 7,626,971 B2
(45) Date of Patent: Dec. 1, 2009

(54) MOBILE COMMUNICATION SYSTEM AND METHOD OF CONTROLLING OPERATION THEREOF

(75) Inventor: Satoshi Noma, Tokyo (JP)

(73) Assignee: NEC Corporation, Tokyo (JP)

( * ) Notice: Subject to any disclaimer, the term of this patent is extended or adjusted under 35 U.S.C. 154(b) by 971 days.

(21) Appl. No.: 10/460,262

(22) Filed: Jun. 13, 2003

(65) Prior Publication Data

US 2004/0002332 A1    Jan. 1, 2004

(30) Foreign Application Priority Data

Jun. 26, 2002    (JP)    ............................. 2002-185417

(51) Int. Cl.
H04J 3/12    (2006.01)
H04J 3/24    (2006.01)
H04J 3/16    (2006.01)
H04B 7/216    (2006.01)

(52) U.S. Cl. ...................... 370/342; 370/469; 370/524

(58) Field of Classification Search ................ 370/342, 370/310, 328, 329, 330, 338, 349, 465, 469, 370/524; 455/422.1, 428, 560
See application file for complete search history.

(56) References Cited

U.S. PATENT DOCUMENTS

| | | | | |
|---|---|---|---|---|
| 5,452,296 | A * | 9/1995 | Shimizu | 370/399 |
| 6,195,331 | B1 * | 2/2001 | Tani | 370/230 |
| 6,791,963 | B1 * | 9/2004 | Hwang et al. | 370/342 |
| 6,795,437 | B1 * | 9/2004 | Rasanen et al. | 370/395.1 |
| 2002/0002049 | A1 * | 1/2002 | Nicolas | 455/433 |
| 2002/0089949 | A1 * | 7/2002 | Bjelland et al. | 370/331 |
| 2002/0150092 | A1 * | 10/2002 | Bontempi et al. | 370/389 |

(Continued)

FOREIGN PATENT DOCUMENTS

WO    02/05573 A2    1/2002

OTHER PUBLICATIONS

Andrei, Zimenkov. "Transport Resource Management within UMTS Radio Network Subsystem", Lappeenranta University of Technology webpage, published: Apr 22, 2002 retrieved from the Internet Aug. 29, 2008 https://oa.doria.fi/bitstream/handle/10024/34904/nbnfi-fe20021270.pdf.*

(Continued)

Primary Examiner—Seema S Rao
Assistant Examiner—Xavier Wong
(74) Attorney, Agent, or Firm—Young & Thompson

(57) ABSTRACT

By separating a function responsible for a control plane and a function responsible for a user plane into physically independent devices, a radio access network system, in which expandability and flexibility of a network is enhanced, is obtained. In the radio access network (RAN) system, the RAN is so designed that a server responsible for the control plane (CPS) and a server responsible for the user plane (UPS) are physically separated from each other. In response to an external request, a logical connection is set between the CPS and the UPS. For identification of the logical connection, mapping between a mobile unit or a radio bearer and the logical connection is managed using a logical connection ID. Thus, the CPS and UPS can independently be added or removed in a system configuration, thus enhancing the scalability of a mobile communication system.

23 Claims, 18 Drawing Sheets

U.S. PATENT DOCUMENTS

2003/0036387 A1* 2/2003 Kovacs et al. ............... 455/442
2003/0152063 A1* 8/2003 Giese et al. ................. 370/349
2004/0102200 A1* 5/2004 Palkisto et al. ............. 455/466
2005/0227695 A1* 10/2005 Rasanen et al. ............. 455/436

OTHER PUBLICATIONS

"OpenRan Architecture in 3$^{rd}$ Generation Mobile Systems", Technical Report MTR-007 Release v1.0.0, Mobile Wireless Internet Forum; Sep. 4, 2001.

"Universal Mobile Telecommunications System (UMTS); Radio Interface Protocol Architecture", (3GPP TS 25.301 version 5.0.0 Release 5), ETSI TS 125 301.

James Kempf et al., "OpenRAN: A New Architecture for Mobile Wireless Internet Radio Access Networks," IEEE Communications Magazine, 2002, pp. 118-123.

"Technical Specification Group Services and System Aspects; GPRS Service Description; Stage 2 (Release 1999)", 2001, pp. 154-158.

3GPP, "3$^{rd}$ Generation Partnership Project; Technical Specification Group Radio Access Network; Radio Interface Protocol Architecture (Release 5)", TS 25.301 version 5.0.0 (Mar. 2002), pp. 1-43.

* cited by examiner

CASE FOR DEDICATED CONTROL CHANNEL (DCCH)

CASE FOR PAGING AREA (AT PAGING AREA SETTING)

FUNCTIONAL BLOCK OF C PLANE SERVER 41

FUNCTIONAL BLOCK OF U PLANE SERVER 42

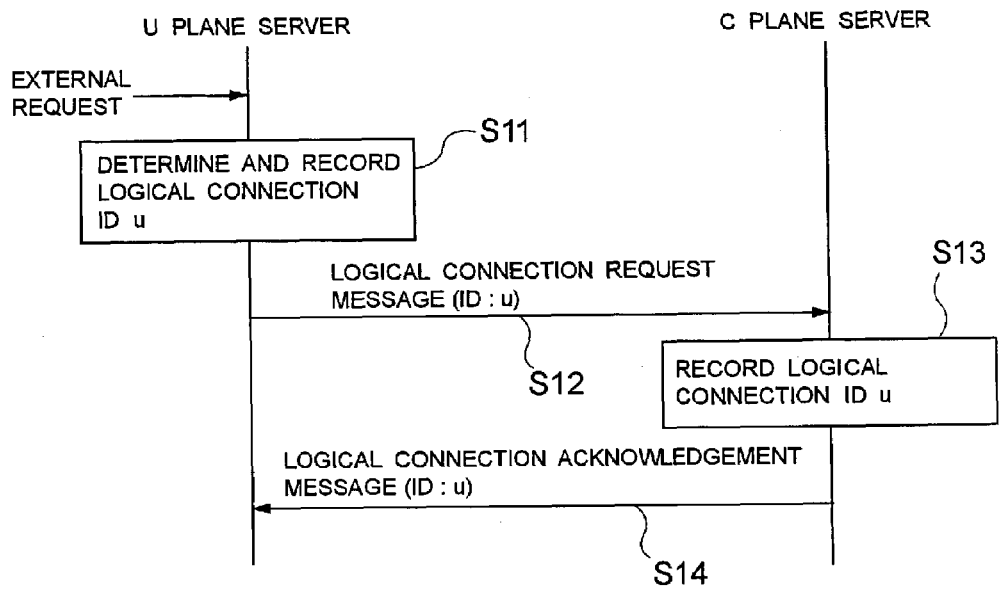
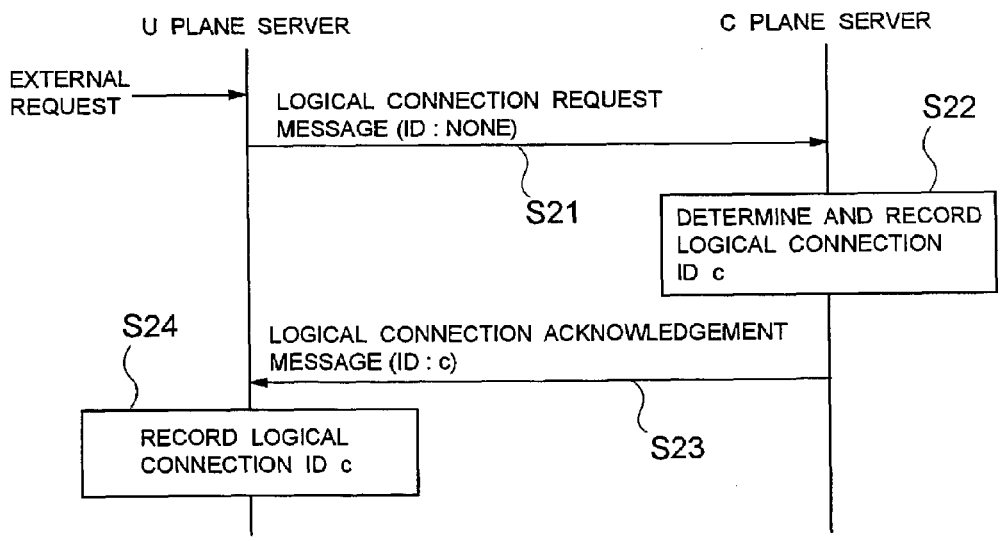

LOGICAL CONNECTION SETTING METHOD 4

LOGICAL CONNECTION SETTING METHOD 5

LOGICAL CONNECTION SETTING METHOD 6

FIG. 15

TABLE 105

| C PLANE LOGICAL CONNECTION ID | MOBILE UNIT ID | CELL ID | PAGING AREA ID | U PLANE LOGICAL CONNECTION ID |
|---|---|---|---|---|
| c | 2a | | | u |
| | | | | |
| | | | | |
| | | | | |

FIG. 16

TABLE 206

| U PLANE LOGICAL CONNECTION ID | RADIO BEARER ID | C PLANE LOGICAL CONNECTION ID |
|---|---|---|
| u | 50a | c |
| | | |
| | | |

FIG. 17

TABLE 206

| LOGICAL CONNECTION ID | RADIO BEARER ID |
|---|---|
| u | 50a |
| | |
| | |
| | |

TABLE 105

| LOGICAL CONNECTION ID | MOBILE UNIT ID | CELL ID | PAGING AREA ID |
|---|---|---|---|
| u | 2a | | |
| | | | |
| | | | |
| | | | |

FIG. 20

CORRESPONDENCE TABLE BETWEEN CELLS AND C PLANE SERVERS BELONGING TO U PLANE SERVER 42a

| C PLANE SERVER | CELL |
|---|---|
| 41a | 1, 2, 3 |
| 41b | 4, 5, 6 |
| .... | .... |

FIG. 21

CORRESPONDENCE TABLE BETWEEN MOBILE UNITS AND C PLANE SERVERS BELONGING TO C PLANE SERVER 41a

| MOBILE UNIT | C PLANE SERVER |
|---|---|
| a a a | 41a |
| b b b | |
| c c c | 41b |
| d d d | |
| .... | .... |

FIG. 22

USE STATUS TABLE OF OTHER C PLANE SERVERS BELONGING TO C PLANE SERVER 41a

| USE STATUS | C PLANE SERVER |
|---|---|
| 90 % | 41a |
| 80 % | 41b |
| 50 % | 41c |
| 85 % | 41d |
| .... | .... |

MOBILE COMMUNICATION SYSTEM AND METHOD OF CONTROLLING OPERATION THEREOF

BACKGROUND OF THE INVENTION

1. Field of the Invention

The present invention relates to a mobile communication system and a method of controlling operation thereof, and particularly, to an improvement of a RNC (Radio Network Controller) in a W-CDMA cellular mobile communication system.

2. Description of the Prior Art

An architecture of a W-CDMA communication system that is a mobile communication system is shown in FIG. 23. A radio access network (RAN) 1 is configured with radio network controllers (RNC) 4, 5 and Node B6 to 9, and is connected with a core network (CN) 3 as an switching network via an Iu interface. The Node B6 to 9 are logical nodes for radio transmission/reception, and more specifically radio base station apparatus.

An interface between the Node B and RNC is referred to as Iub, and Iur interface is also standardized as an interface between RNCs. Each Node B covers one or more cells 10 and is connected to a mobile unit (UE) 2 via a radio interface. The RNC manages the Node B and selectively combining and splitting radio paths. Note here that the detail of the architecture shown in FIG. 23 is specified in 3GPP (3rd Generation Partnership Projects).

FIG. 24 shows protocol architecture of the radio interface in the W-CDMA communication system shown in FIG. 23. As shown in FIG. 24, the protocol architecture is composed of three protocol layers of a physical layer (PHY) 11 denoted as L1, a data link layer 12 denoted as L2, and a network layer (RRC: Radio Resource Control) 13 positioned in an upper layer of the data link layer 12 and denoted as L3. The data link layer L2 includes two sublayers of a MAC (Media Access Control) layer 121 and a RLC (Radio Link Control) layer 122.

An ellipse shown in FIG. 24 indicates a service access point (SAP) between layers or sublayers, where the SAP between the RLC sublayer 122 and the MAC sublayer 121 provides a logical channel. That is, the logical channel is provided from the MAC sublayer 121 to the RLC sublayer 122, and is classified by functions and logical properties of a signal and characterized by contents of transferred information. The logical channel includes, for example, common channels of CCCH (Common Control Channel) and PCCH (Paging Control Channel), dedicated channels of DCCH (Dedicated Control Channel) and DTCH (Dedicated Traffic Channel), or the like.

The SAP between the MAC sublayer 121 and the physical layer 11 provides a transport channel which is supplied from the physical layer 11 to the MAC sublayer 121. The transport channel is classified by a transmission form and is characterized depending on how and what information is transmitted via a radio interface. The transport channel includes, for example, a FACH (Forward Access Channel), a RACH (Random Access Channel), a PCH (Paging Channel), a DCH (Dedicated Channel), or the like.

The physical layer 11 and the data link layer 12 are controlled by the network layer (RRC) 13 via a C-SAP providing a control channel. The detail of the protocol architecture shown in FIG. 24 is specified in ARIB STD-T36-25.301v.3.8.

In the conventional art, there exists a C (Control) plane that controls signaling, and a U (User) plane that transports user data.

The RNCs 4, 5 of the radio access network (RAN) 1 in the conventional art are apparatuses in which both functions of the C plane and U plane are physically integrated. By such a single apparatus in which both the functions are integrated, a radio bearer service is provided to a mobile unit.

In a mobile communication system including such a conventional RNC that integrally has the functions of both U plane and C plane, if we need to enhance the function of C plane, however the RNC itself should be added in the system. In the same way if we need to enhance the function of U plane, however the RNC itself should be added in the system. Therefore, the conventional RNC constitution makes constructing a system with high scalability quite difficult.

In the radio access network, it is conceivable to separate the C plane and the U plane from a conventional RNC, however, for realization of such separation, a device responsible for the C plane is required to utilize a bearer service provided by a device responsible for the U plane to receive or transmit signal to the mobile unit. Therefore, it is necessary to set a logical connection between the device responsible for the C plane and the device responsible for the U plane in order to transmit/receive signal.

At this time, there exists disadvantages that the device responsible for the U plane must identify a plurality of logical connections, to provide appropriate bearer services, and also that the devices responsible for the C plane must identify the logical connection to receive signal from the mobile unit or transmit signal to the mobile unit.

SUMMARY OF THE INVENTION

It is, therefore, an object of the present invention to provide a mobile communication system in which a function responsible for a C plane and a function responsible for a U plane can be separated into physically independent devices to thereby enhance network expandability and flexibility, and a method of controlling operation of the mobile communication system.

According to the present invention, there is provided a mobile communication system which includes a mobile unit, a radio base station apparatus, and a radio network controller, comprising: user plane controlling means for carrying user data in relation to the mobile unit; and control plane controlling means for controlling signals, the control plane controlling means being physically separated from the user plane controlling means, wherein, in response to an external request, setting of a logical connection for signaling is controlled between the control plane controlling means and the user plane controlling means by using a logical connection identifier.

In the mobile communication system of the present invention, the external request includes a transmission destination identifier indicating a destination of signal that the control plane controlling means transmits in response to the external request, at least either one of the control plane controlling means and the user plane controlling means comprises means for determining the logical connection identifier in response to the external request, and each of the control plane controlling means and the user plane controlling means comprises means for generating a logical connection corresponding to the logical connection identifier. In addition, the control plane controlling means comprises means for associating the logical connection identifier with the transmission destination identifier and recording the association, and the user plane controlling means comprises means for recording the logical connection identifier and a radio bearer to carry signal, associating the logical connection identifier with the radio bearer, and recording the association.

Furthermore, in the mobile communication system of the present invention, both of the control plane controlling means and the user plane controlling means comprise means for adding a header including the logical connection identifier to the signal, transmitting the resultant information over the logical connection. Both of the control plane means and the user plane means also comprise means for receiving the information over the logical connection, removing the header from data via the logical connection. The user plane controlling means also comprises means for transmitting the signal to the mobile unit via the radio bearer. The logical connection corresponds to a common channel or a dedicated channel.

According to the present invention, there is provided a method of controlling operation of a mobile communication system which includes user plane controlling means for carrying user data in relation to a mobile unit and control plane controlling means for controlling signal, the control plane controlling means being physically separated from the user plane controlling means, the method comprising: a step of setting and controlling a logical connection between the control plane controlling means and the user plane controlling means by using a logical connection identifier in response to an external request.

In the method of controlling operation of the present invention, the external request includes a transmission destination identifier indicating a destination of the signal that the control plane controlling means transmits in response to the external request. The same method comprises: a step of, in at least either one of the control plane controlling means and the user plane controlling means, determining the logical connection identifier in response to the external request; and a step of, in each of the control plane controlling means and the user plane controlling means, generating a logical connection corresponding to the logical connection identifier. The same method further comprises: a step of, in the control plane controlling means, recording the logical connection identifier and the transmission destination identifier with their being associated with each other; and a step of, in the user plane controlling means, recording the logical connection identifier and an identifier of a radio bearer to carry signal, associating the logical connection identifier with the radio bearer, and recording the association.

Furthermore, the method of controlling operation of the present invention comprises a step of, in each of the control plane controlling means and the user plane controlling means, adding a header including the logical connection identifier to the signal and transmitting the resultant information over the logical connection.

An operation of the present invention will be described. According to the present invention, the logical connection is set between a C (Control) plane function responsible for a C plane and a U (User) plane function responsible for a U plane, therefore the C plane function and the U plane function which are conventionally configured integrally can physically be separated from each other, which allows a plurality of C plane functions to control a plurality of U plane functions, thus enhancing expandability and flexibility.

Furthermore, when both the functions are thus separated, a function part responsible for the control plane needs to utilize the radio bearer prepared by a function part responsible for the user plane when providing the signal to the mobile unit, therefore it is necessary to set the logical connection between the C plane function and the U plane function. At this time, if the U plane function does not recognize the correspondence between logical connections and radio bearers, it is not able to provide the signal to an appropriate mobile unit. In the present invention, the logical connection is assigned with an identifier to be able to manage recognizably the correspondence between logical connections and mobile units or radio bearers, which mobile units enable receiving and transmitting the appropriately, and network system utilizing the logical connection enables coping flexibly with a change of other elements in the network system. The flexibility to a change of other elements in the network system is realized because a header does not contain information representing a user ID (identifier), a radio bearer ID, or the like, thus providing an advantage such that, for example, even when the data length of the ID indicating a user is changed, a functional change in connection with the logical connection is made only for the size of a table (e.g., FIG. 15).

BRIEF DESCRIPTION OF THE DRAWINGS

FIG. 10 is an operation sequence diagram of a logical connection setting method 2 according to the present invention;

FIG. 11 is an operation sequence diagram of a logical connection setting method 3 according to the present invention;

FIG. 15 is a diagram showing one example of a logical connection ID table 105 of the C plane server;

FIG. 16 is a diagram showing one example of a logical connection ID table 206 of the U plane server;

FIG. 17 is a diagram showing another example of the logical connection ID table 206 of the U plane server;

FIG. 20 is a correspondence table between C plane servers and cells that belongs to the U plane server 42a in FIG. 19;

FIG. 21 is a correspondence table between mobile units and C plane servers that belongs to the C plane server 41a in FIG. 19;

FIG. 22 is a use status table of other C plane servers that belongs to the C plane server 41a in FIG. 19;

DETAILED DESCRIPTION OF THE PREFERRED EMBODIMENTS

Figure 1:
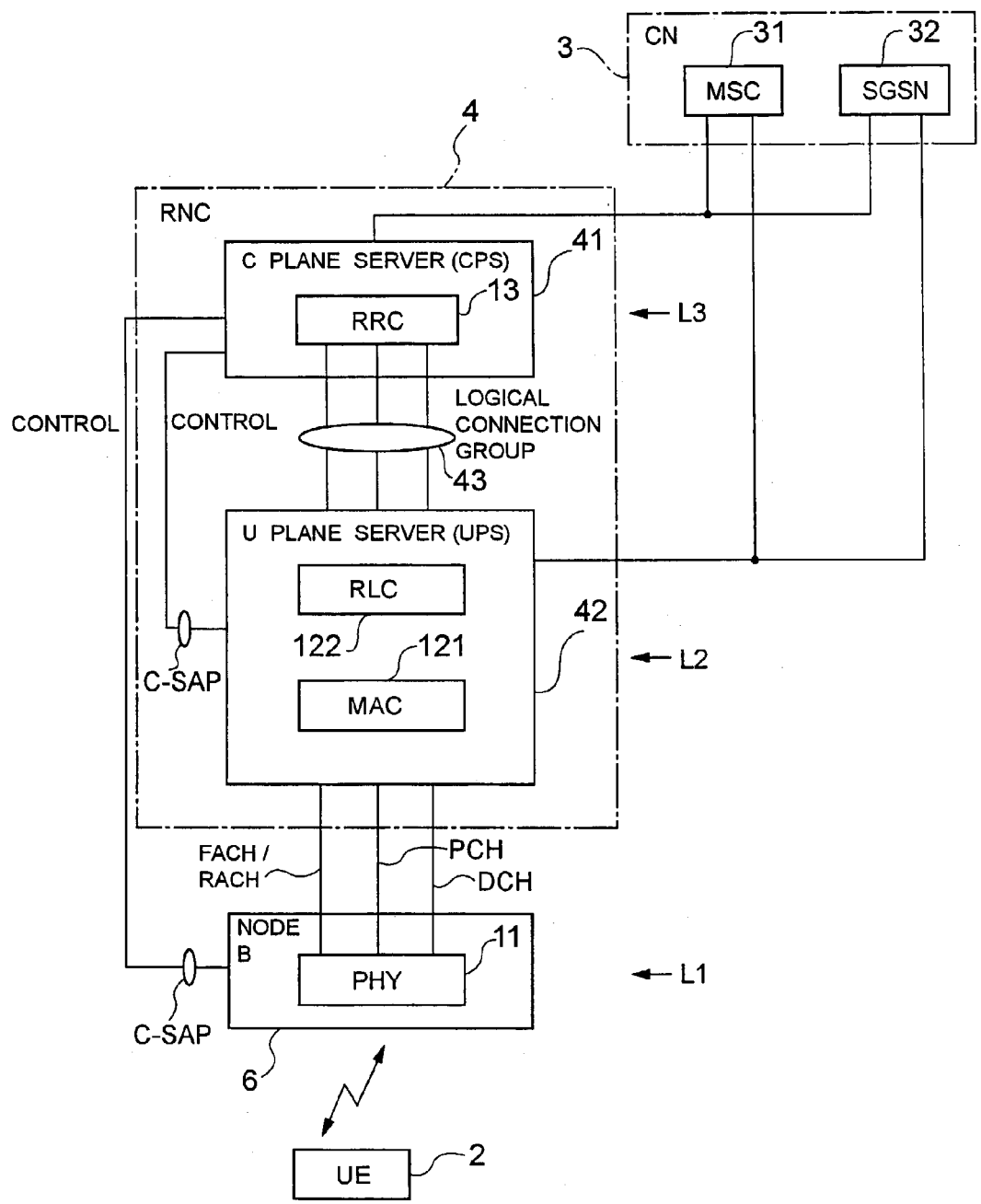
FIG. 1 is a block diagram according to embodiments of the present invention.
Figure 24:
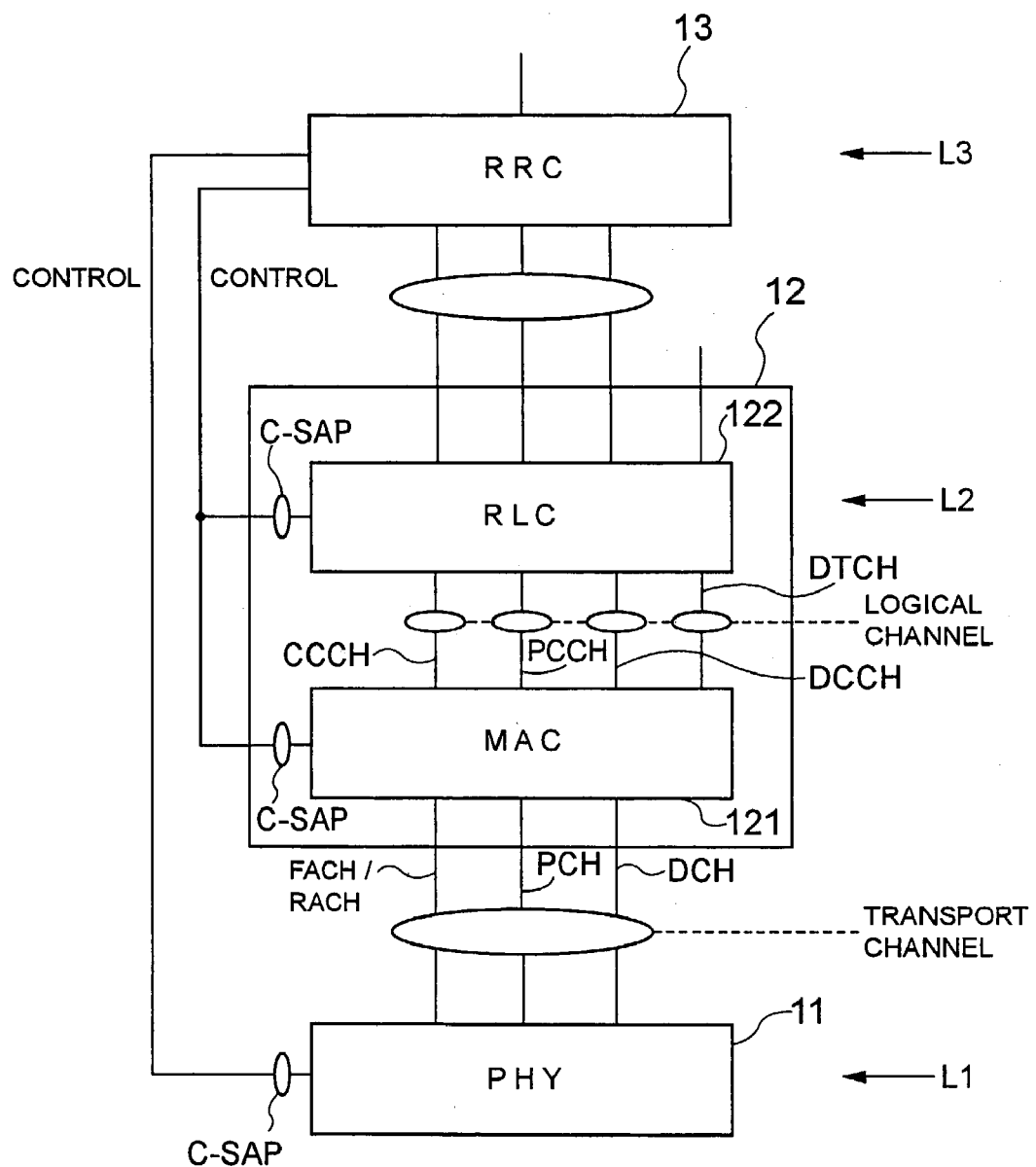
FIG. 24 is a diagram showing a protocol architecture in a RAN of FIG. 23.

With reference to drawings, embodiments of the present invention will be described below. FIG. 1 is a functional block diagram according to the embodiments of the present invention, where the same parts as in FIG. 24 are indicated with the same reference numerals and characters. As shown in FIG. 1, the RNC 4 is separated, then the constitution are C plane server (CPS: Control Plane Server) 41, which is equivalent to a control function part responsible for a C plane for controlling signaling, and a U plane server (UPS: User Plane Server) 42, which is equivalent to a control function part responsible for a U plane for carrying user data, are separated from each other. Between the servers 41 and 42, a logical connection (described later in detail) group 43 is set.

More specifically, the C plane server 41 has a function of generating and terminating a RRC message in the RRC layer 13, and the U plane server 42 has functions for which the MAC layer 121 and RLC layer 122 are responsible. A RRC message is transferred to the RRC layer 13 in the C plane server 41 and the mobile unit after the use of the functions offered by the MAC layer 121 and the RLC layer 122 in the U plane server 42.

Accordingly, in the existing radio interface protocol architecture shown in FIG. 24, the physical layer (PHY) 11 denoted as L1, the data link layer 12 denoted as L2, and the network layer 13 denoted as L3 are separated into a Node B (radio base station apparatus) 6, the U plane server 42, and the C plane server 41, respectively. In FIG. 1, the connectivity between the MAC layer 121 and the RLC layer 122 is the same as in the example of FIG. 24, so is omitted.

The RRC layer 13 in the C plane server 41 controls the physical layer 11 in the Node B, and the MAC layer 121 and the RLC layer 122 in the U plane server 42, by means of a C-SAP (Control Service Access Point). A signal from each of a MSC (Mobile Switching Center) 31 and a SGSN (Serving GPRS (Global Packet Radio Service) Switching Node) 32 is terminated for processing in the C plane server 41.

Figure 23:
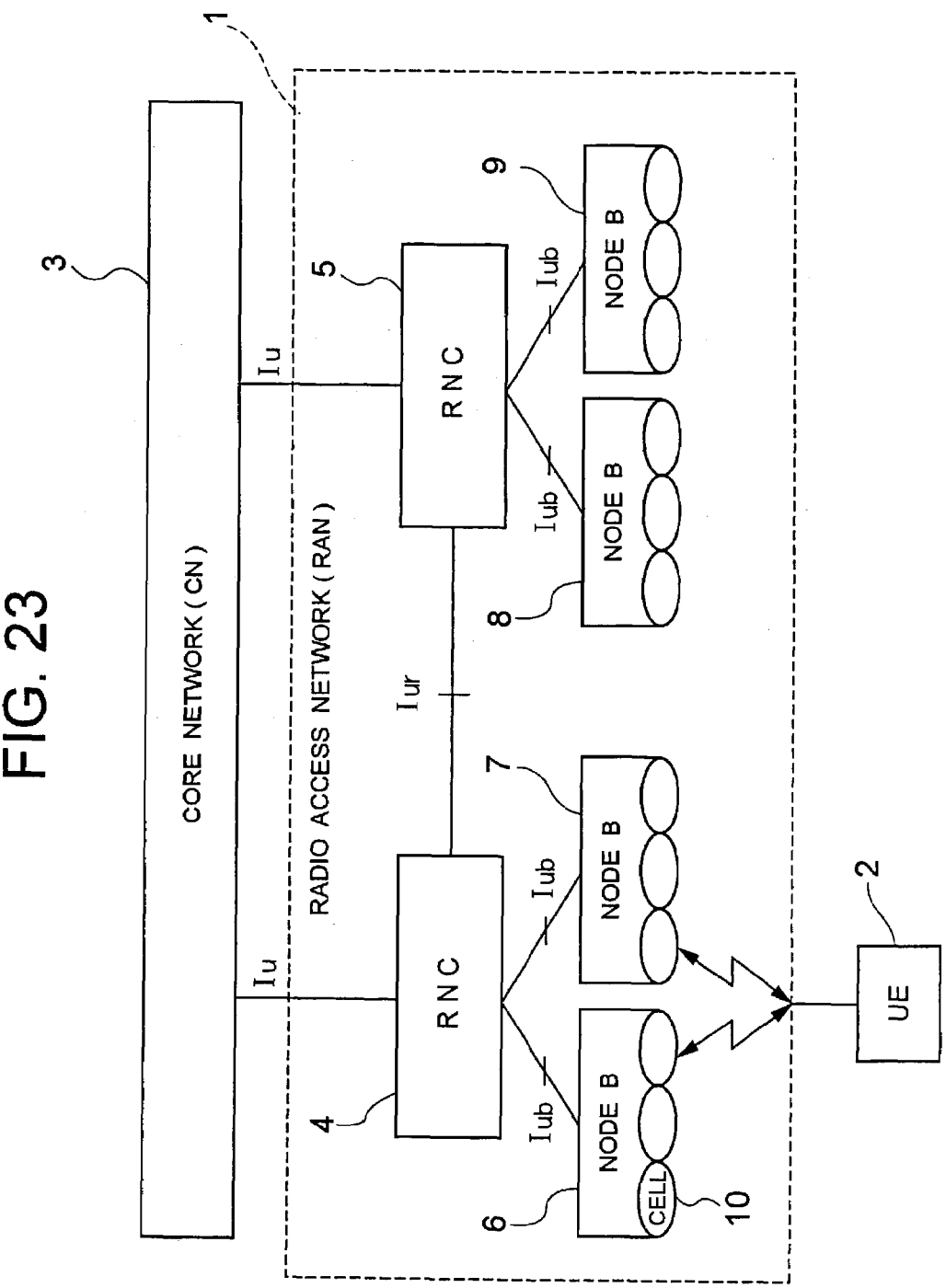
FIG. 23 is a diagram showing a system architecture in a W-CDMA mobile communication system.

The MSC 31 has a circuit switching function and the SGSN 32 has a packet switching function, both of which are included in the Core Network (CN) 3 shown in FIG. 23. User data is transferred via the U plane server 42 between the mobile unit (UE) 2 and each of the MSC 31 and SGSN 32.

The constitution of the apparatus as shown in FIG. 1 makes it possible to configure a system with high scalability. That is, only the C plane server 41 may be added to enhance signaling processing capability, and only the U plane server 42 may be added to increase total amount of user data to be handled. In addition, each layers in the U plane server 42 has no relation with each other and is controlled by the RRC 13 in the C plane server 41, thus enabling the implementation as an independent device.

Figure 2:
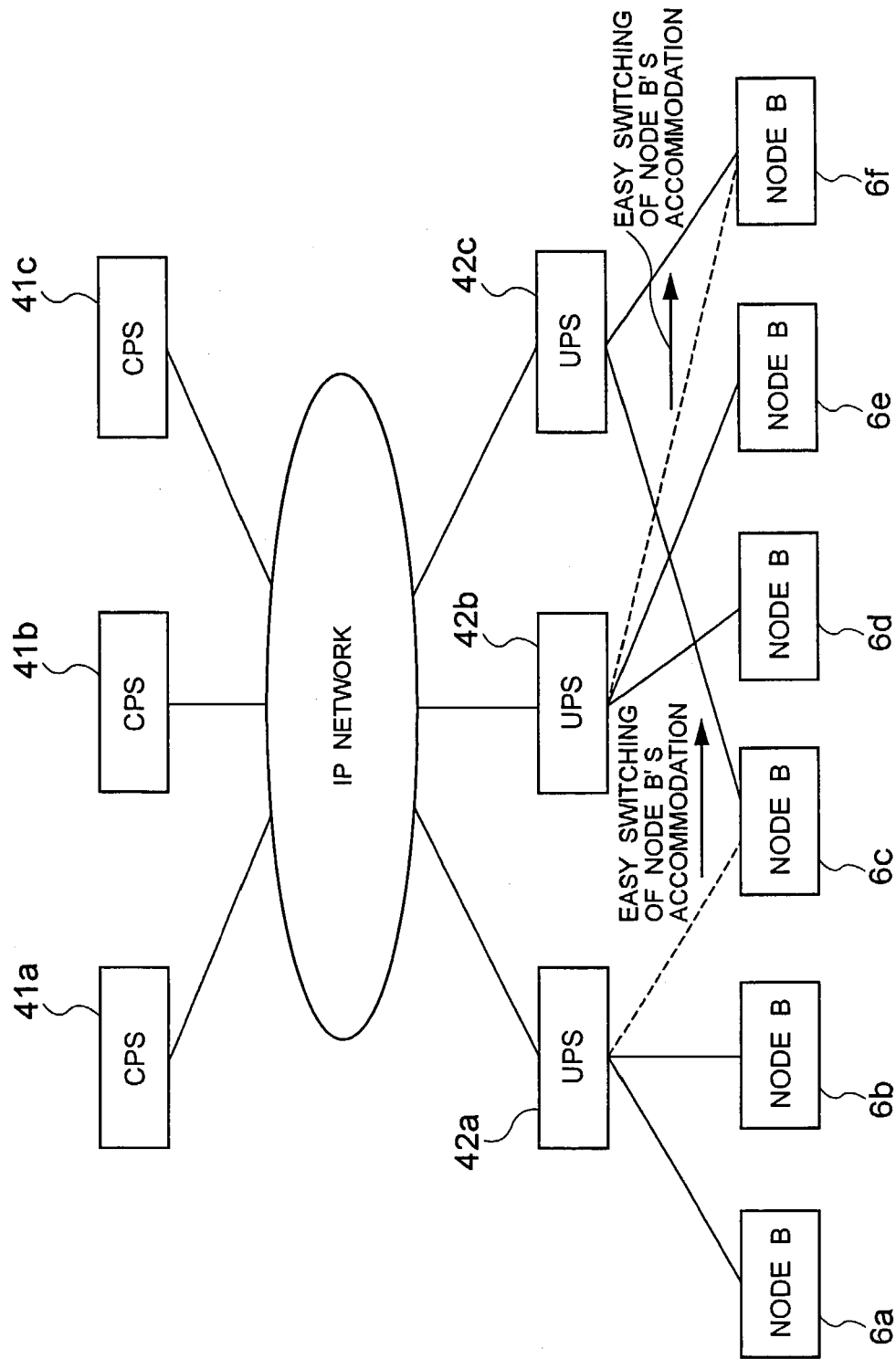
FIG. 2 is a diagram illustrating an example of a system with high scalability, which is an advantage of the embodiments of the present invention.

FIG. 2 is a diagram illustrating that scalability can be maintained between the C plane server (CPS) and the U plane server (UPS) separated from each other according to the embodiments of the present invention. C plane servers 41a to 41c and U plane servers 42a to 42c are interconnected over a communication network such as an IP Network 300. The C plane server and the U plane server are conventionally integrated as a single RNC apparatus, therefore the RNC itself is required to be added for extension. However, the C plane server, which performs signaling processing such as call processing, has the possibility of lacking processing capacity with increasing call quantity. In this case, by adding a new C plane server, processing may easily be dispersed. For example, if an algorithm whose input is mobile unit number and output is which C plane server to use, is utilized and the number of C plane server are raised from two to three, the enhancement of call processing capacity is about 1.5 times.

On the other hand, the U plane server, which performs transfer of user data, has the possibility of lacking processing capacity with increasing quantity of transmitting data to mobile unit or receiving data from mobile unit. In this case, by adding a new U plane server, processing may easily be dispersed. For example, the constitution of connecting three out of Node B 6a to 6f in subordination to each of two U plane servers 42a, 42b is changed so as to connect two out of the Node B 6a to 6f in subordination to each of three U plane servers 42a, 42b, and 42c, which easily allows an increase of the ability of transferring user data by about 1.5 times.

Thus, in order to configure a system with high scalability as shown in FIG. 2 by physically separating the C plane server and U plane server, it is necessary to set and control the logical connection 43 (see FIG. 1) between the C plane server and the U plane server. In this case, as shown in FIG. 1, the logical connection 43 has three types of configuration. First type configuration corresponds to Dedicated Control Channel (DCCH), second corresponds to Common Control Channel (CCCH), third corresponds to Paging Area (Paging Area is correspond to plural Paging Control Channels (PCCH)).

Figure 3:
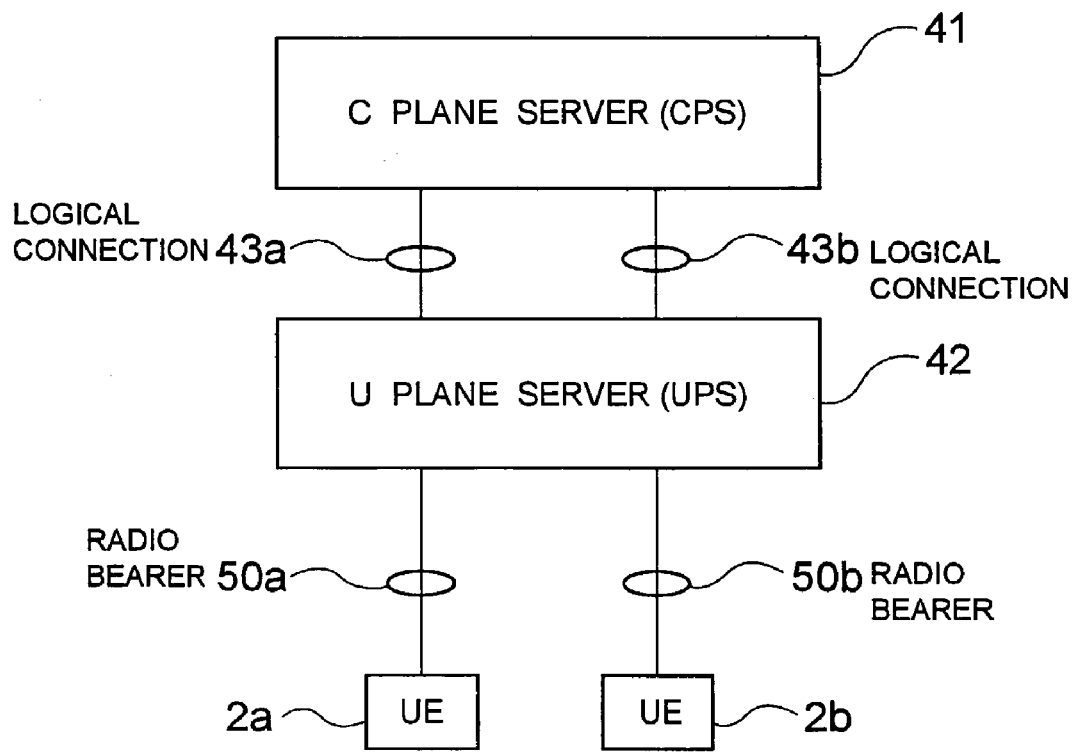
FIG. 3 is a diagram showing relation between logical connections for a C plane server and a U plane server, and mobile units when a Dedicated Control Channel (DCCH) is set.

FIG. 3 shows an example of the setting of the logical connection corresponds to DCCH, where logical connections 43a, 43b are set between the C plane server 41 and the U plane server 42, and radio bearers 50a, 50b are set between the U plane server 42 and mobile units 2a,2b,respectively. The logical connection 43a corresponds to the mobile unit 2a, and the logical connection 43b corresponds to the mobile unit 2b. It should be noted here that a plurality of radio bearers and logical connections may be set for one mobile unit.

Figure 4:
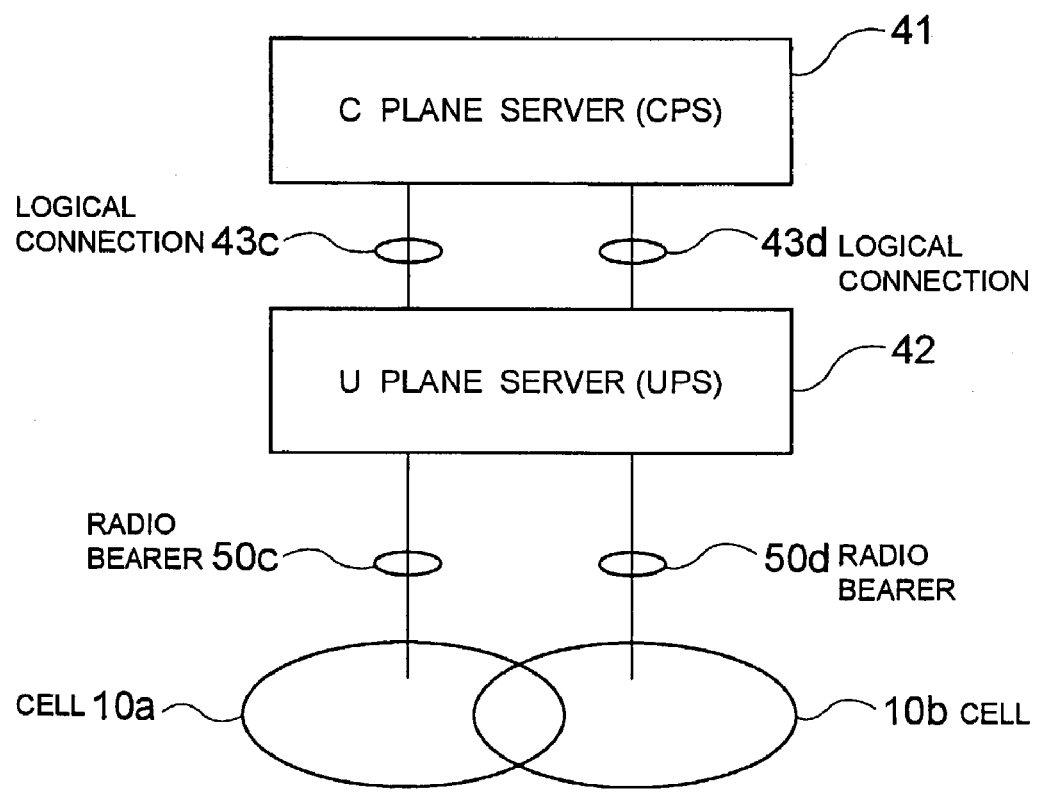
FIG. 4 is a diagram showing relation between logical connections for the C plane server and the U plane server, and cells when a common channel of CCCH is set.

FIG. 4 shows an example of the setting of the logical connection corresponds to CCCH, where logical connections 43c, 43d are set between the C plane server 41 and the U plane server 42, and correspond to radio bearers 50c, 50d having relation with cells 10a, 10b, respectively. The logical connection corresponds to CCCH is set, for example, one for every cell.

Figure 5:
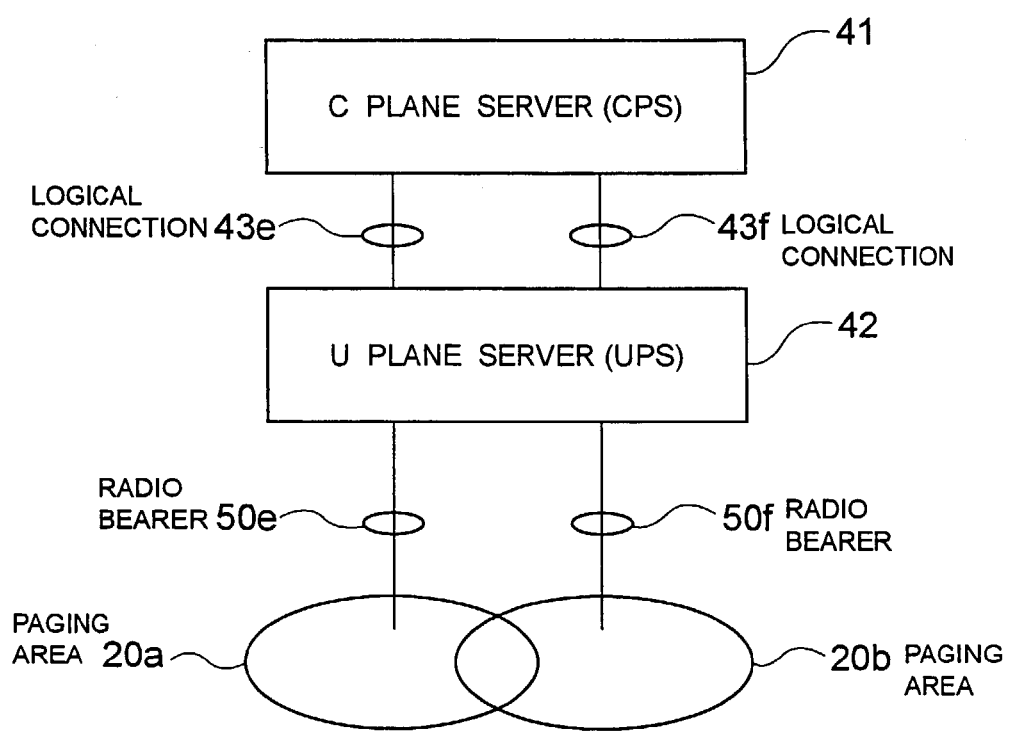
FIG. 5 is a diagram showing relation between logical connections for the C plane server and the U plane server, and paging areas when the paging area is set.

FIG. 5 shows an example of the setting of the logical connection corresponds to the paging area (associated with plural PCCHs), where logical connections 43e, 43f are set between the C plane server 41 and the U plane server 42, and correspond to radio bearers 50e, 50f having relation with paging areas 20a, 20b, respectively. The logical connection corresponds to plural PCCHs is set, for example, one for every paging area.

Figure 6:
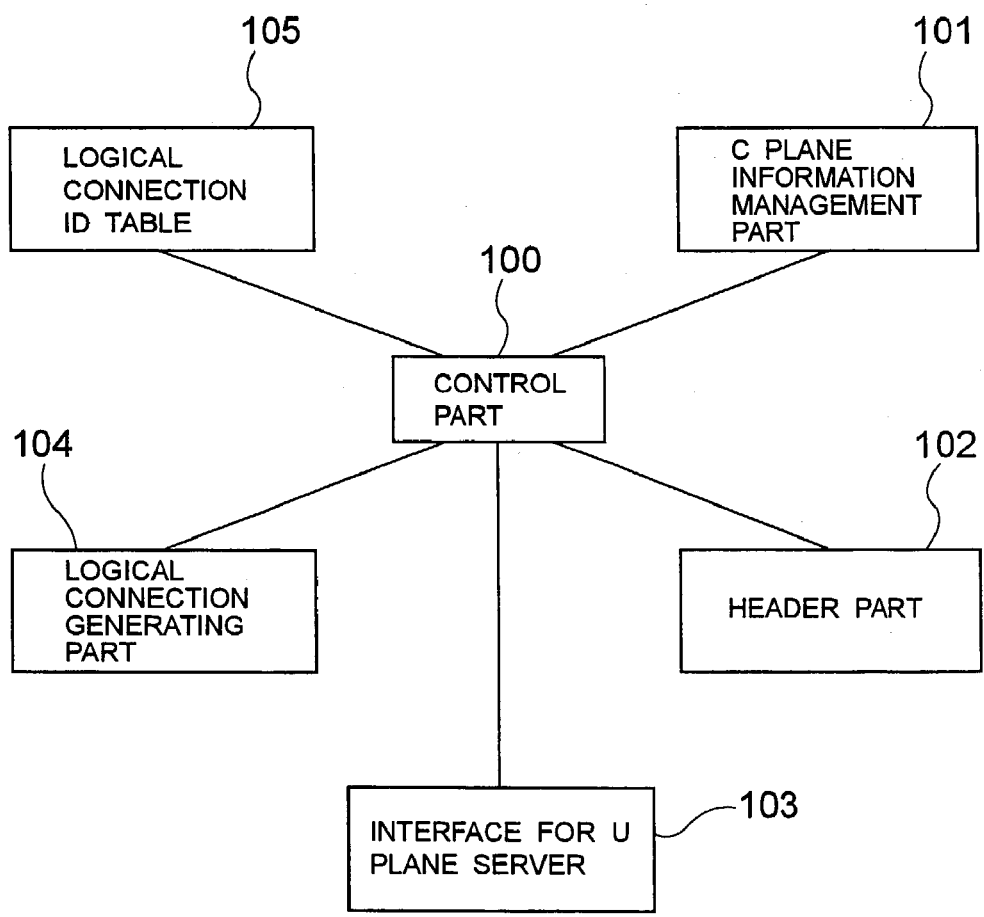
FIG. 6 is a functional block diagram of the C plane server.
Figure 7:
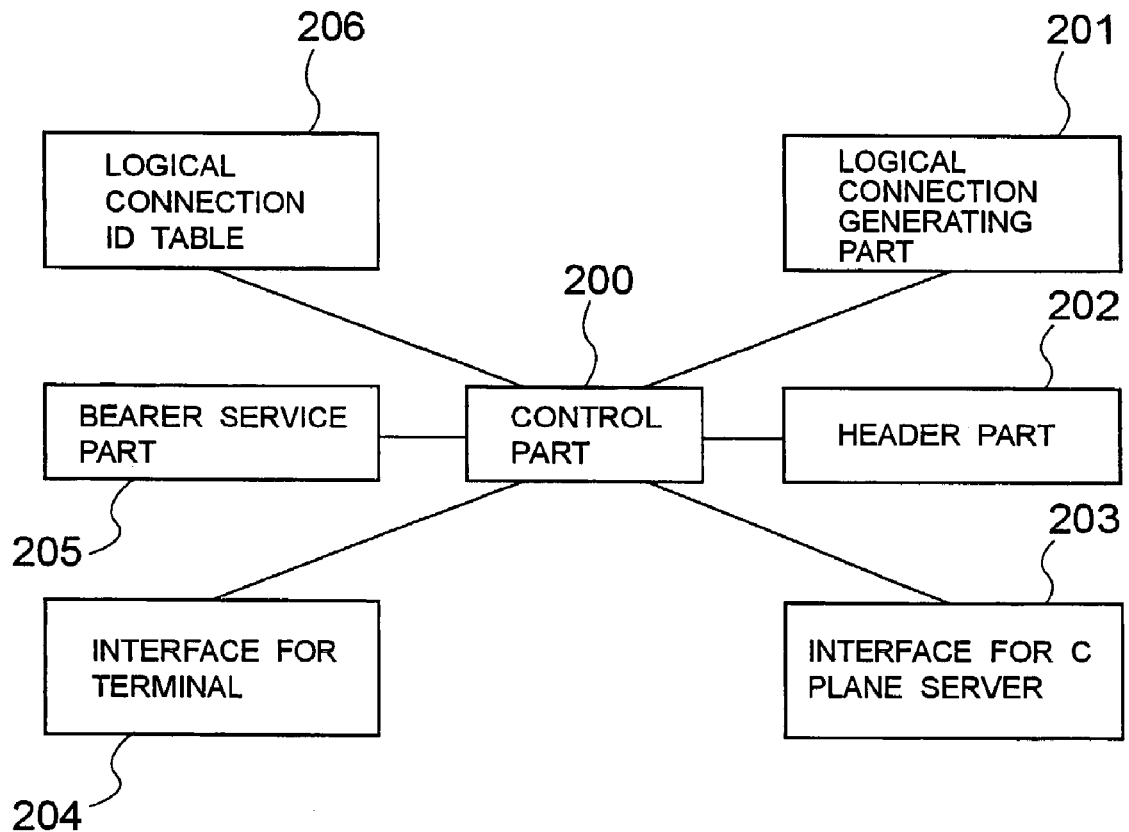
FIG. 7 is a functional block diagram of the U plane server.

FIG. 6 shows a functional block diagram of the C plane server 41, and FIG. 7 shows a functional block diagram of the U plane server 42. Both drawings indicate mainly functions for setting and controlling the logical connection described above between the C plane server and U plane server, which is a featured part of the present invention.

Firstly referring to FIG. 6, the C plane server 41 comprises a control part 100, a C plane information management part 101, a header part 102, an interface part 103 for the U plane server, a logical connection generating part 104, and a logical connection ID (identifier) table 105.

The control part 100 manages the entire device (server), and the C plane management part 101 has a C plane function for the mobile unit. The header part 102 has a function of adding or removing (terminating) a header for identifying the signal over the logical connection. A format of the signal with this header is exemplarily shown in FIG. 8.

Figure 8:
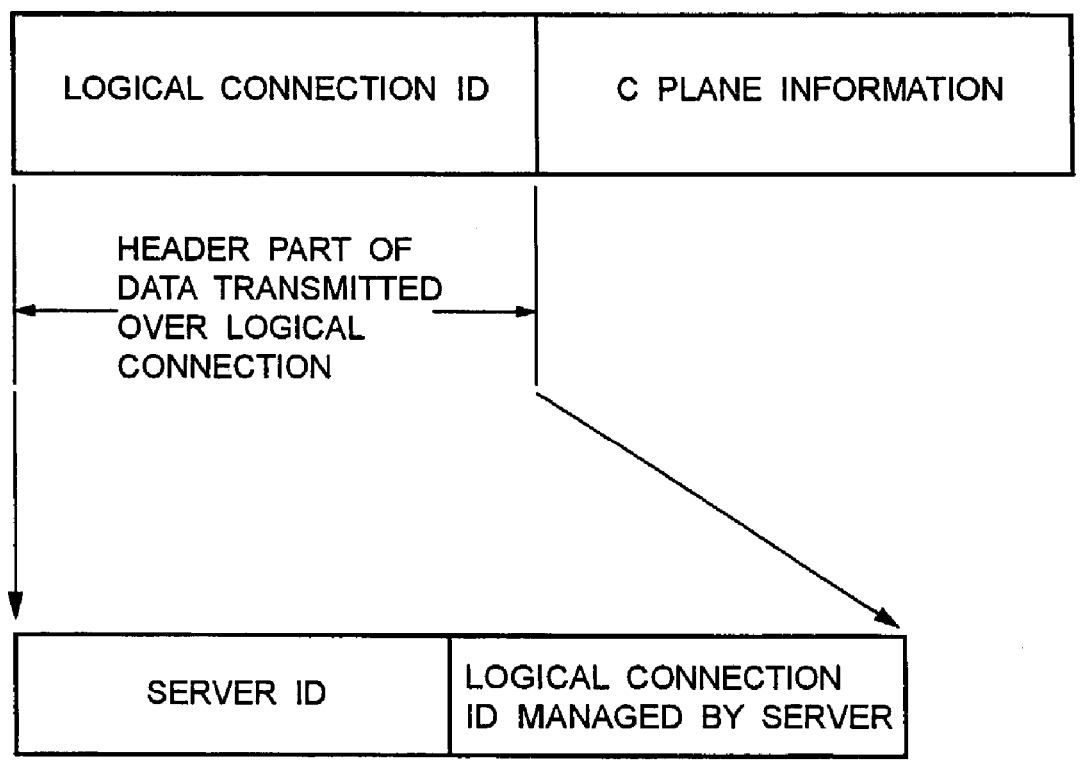
FIG. 8 is a format diagram of C plane information transmitted over the logical connection between the C plane server and the U plane server.

Referring to FIG. 8, the header added to the signal includes an ID for identifying the logical connection over which the signal is transmitted. The ID is designed so as to comprise a signal server ID for identifying the signal server responsible for this and a logical connection ID managed by this C plane server, which allows the use of the logical connection ID common all over the world as long as the C plane server ID is globally unique, thereby providing versatility, however, it is not limited to this example.

The logical connection generating part 104 sets or releases the logical connection. The logical connection ID table 105 is a table for managing the setting of logical connections generated in the logical connection generating part 104, in which is recorded the correspondence between the logical connection ID and the mobile unit (see FIG. 3), the cell (see FIG. 4), the paging area (see FIG. 5), or the like as a destination where the signal is to be transmitted.

FIG. 7 is a functional block diagram of the U plane server 42 which comprises a control part 200, a logical connection generating part 201, a header part 202, an interface part 203 for the C plane server, an interface part 204 for the mobile unit, a bearer service part 205, and a logical connection ID table 206.

The control part 200 manages the entire server, and the logical connection generating part 201 establishes or releases the logical connection. The header part 202 has a function of adding or removing the header (see FIG. 8) for identifying the signal transmitted over the logical connection. The bearer service part 205 manages a radio bearer configuration of the U plane server 42 for the mobile unit. The logical connection ID table 206 is a table for managing the configuration of logical connections generated in the logical connection generating part 201. The correspondence between the logical connection ID and a bearer ID representing the radio bearer is stored in the table.

Figure 9:
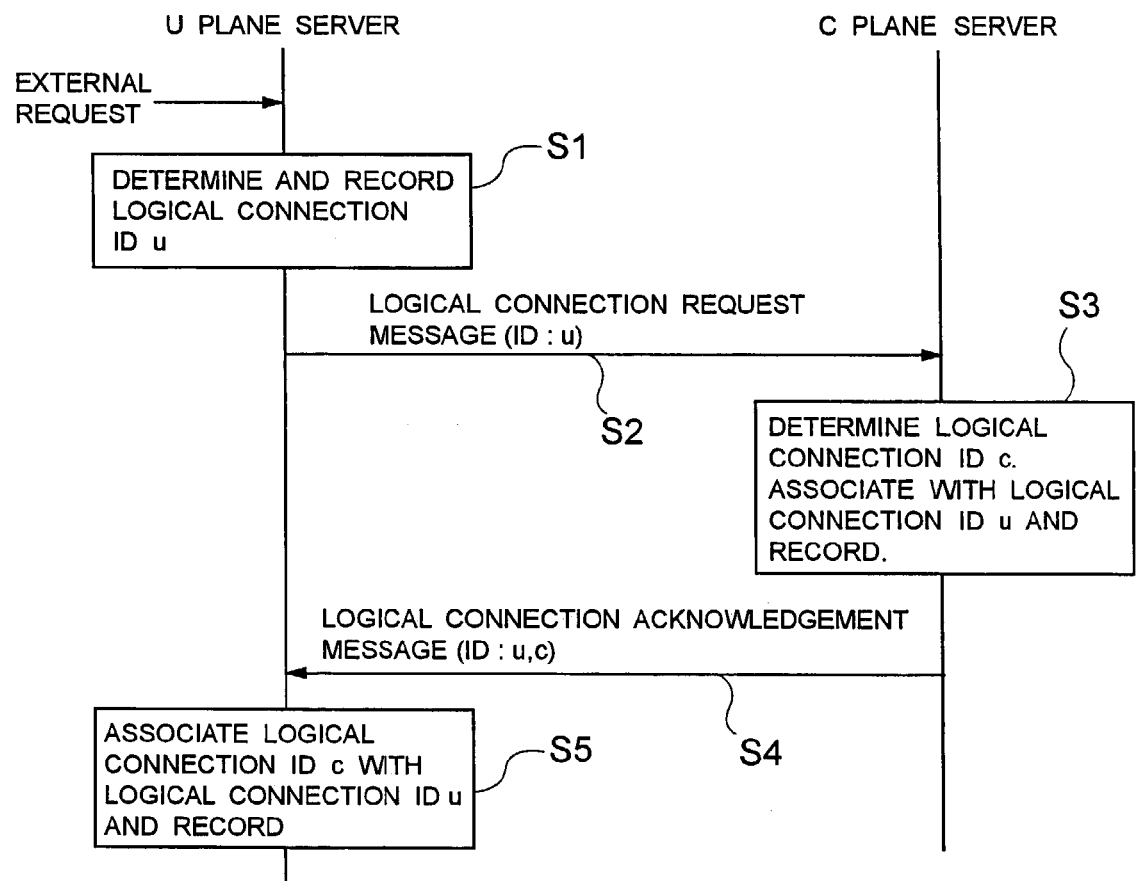
FIG. 9 is an operation sequence diagram of a logical connection setting method 1 according to the present invention.

FIGS. 9 to 14 are diagrams showing operations according to each embodiment of the present invention and show procedures of the logical connection as a sequence. FIGS. 9 to 11 are sequence diagrams indicating methods 1 to 3 of logical connection configuration which are based on the case where the U plane server receives an external request to establish the logical connection.

Firstly, referring to FIG. 9, when the U plane server notices by the external request the need of transmitting the signal to the mobile unit (otherwise to the cell or paging area), the logical connection generating part 201 is activated to obtain a logical connection ID(u), and stores the ID(u) in the table 206 (step S1), then transmits to the C plane server a logical connection request message including the ID(u) and the external request (step S2). This message is transmitted via the C-SAP in FIG. 1 (a control connection which is preset at a start-up of system).

When the C plane server receives this message, the logical connection generating part 104 determines a logical connection ID(c) , stores in the table 105 the ID(c), the ID(u) and a mobile unit ID(2a) to which the signal is to be transmitted (step S3). The mobile unit ID is obtained from the external request included in the logical connection request message. The external request includes mobile unit ID, cell ID, or paging area ID.

An example of the table 105 at this time is shown in FIG. 15. Note here that, in the case where the logical connection is for the CCCH or plural PCCHs shown in FIGS. 4 and 5, instead of "terminal ID", a "cell ID" or "paging area ID" is stored respectively in the table 105 of FIG. 15.

The logical connection generating part 104 transmits a logical connection acknowledgement message including the ID(u) and the ID(c) to the U plane server (step S4). This message is transmitted via the C-SAP (a control connection which is preset at start-up of system) in FIG. 1. The U plane server receives this message, associates the ID(c) determined by the C plane server with the ID(u) that the U plane server itself has determined, and stores them (step S5) in the table 206. Next, between the mobile unit having the mobile unit ID (2a) and the U plane server, the bearer service part 205 sets the radio bearer 50a, and an ID (50a) of this bearer is stored in the table 206 with being associated with the ID(u), as shown in FIG. 16. Consequently, the logical connection is established between the U plane server and the C plane server.

Using the logical connection thus obtained, C plane information added with the header in FIG. 8 is transmitted from the C plane server to the U plane server, and C plane information whose header is removed is transmitted from the U plane server to the mobile unit 2a via the radio bearer 50a.

The method 1 in FIG. 9 is one in which the U plane server is activated first and both the C plane server and the U plane server determine the logical connection IDs, whereas the method 2 in FIG. 10 is that in which the U plane server is activated first and only the U plane server determines the logical connection ID.

More specifically, in response to the external request, the U plane server determines and records the logical connection ID (u) in the table 206 (step S11). The logical connection request message including the ID (u) is transmitted from the U plane server to the C plane server (step S12). This message is transmitted via the C-SAP in FIG. 1. The C plane server having received this message records the logical connection ID(u) in the table 105 (step S13), and transmits the logical connection acknowledgement message (including the ID(u)) to the U plane server (step S14). This message is transmitted via the C-SAP in FIG. 1.

Figures 18, 19:
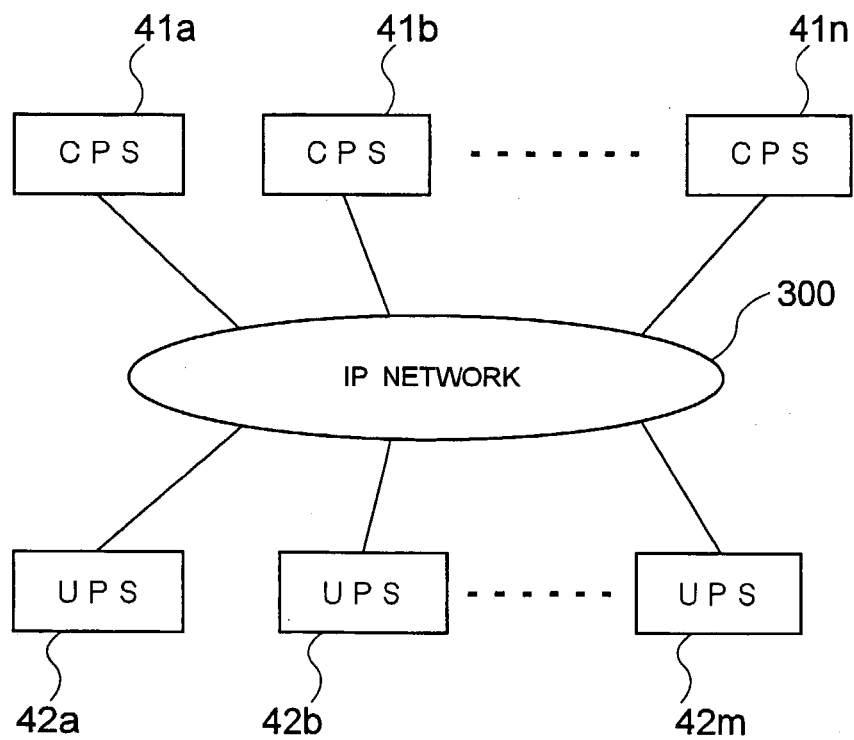
FIG. 18 is a diagram showing another example of the logical connection ID table 105 of the C plane server.
FIG. 19 is a block diagram of a system having a plurality of C plane servers and U plane servers.

FIG. 17 shows contents in the table 206 of the U plane server, and FIG. 18 shows contents in the table 105 of the C plane server. Also in the table 105 of FIG. 18, the "mobile unit ID", "cell ID" or "paging area ID" is recorded in correspondence with respective cases in FIGS. 3 to 5.

The method 3 shown in FIG. 11 is one in which the U plane server is activated first and the C plane server determines the logical connection ID(c). In response to the external request, the U plane server transmits the logical connection request message to the C plane server (step S21). This message is transmitted via the C-SAP in FIG. 1. The C plane server having received this message determines and records the logical connection ID(c) in the table 105 (step S22), and then transmits the logical connection acknowledgement message including the ID(c) to the U plane server (step S23). This message is transmitted via the C-SAP in FIG. 1. The U plane server associates the ID(c) with the bearer ID and records them in the table 206, which is the same as the foregoing description (step S24).

The methods 1 to 3 described above are applicable in configuring the logical connection in the case where the cell is not yet set nor does the logical connection exist between the C plane server and the U plane server. The configuring of the cell refers to the configuring of a channel for synchronization between the mobile unit and radio base station, a channel for broadcast information, other common channels, and paging channels. The C plane server may determine contents of Cell configuration and execute the necessary processing of Cell Configuration for the U plane server and the radio base station via the C-SAP. Logical connections in the following examples correspond to the common channel and plural paging channels.

In this case, for example, when an equivalent to a cell setup request (corresponding to the external request) is inputted to the U plane server from Node B, the logical connection request message is transmitted from the U plane server to the C plane server, as shown in FIGS. 9 to 11, and the logical connections corresponding to CCCH and the logical connections corresponding to plural PCCHs are also set as described in FIGS. 9 to 11. The U plane server holds the table 206 for recognizing the correspondence between the logical connections corresponding to CCCH and radio bearer ID corresponding to CCCH. In case of the logical connections corresponding to plural PCCH, the U plane server holds the table 206 like the one above.

Figure 12:
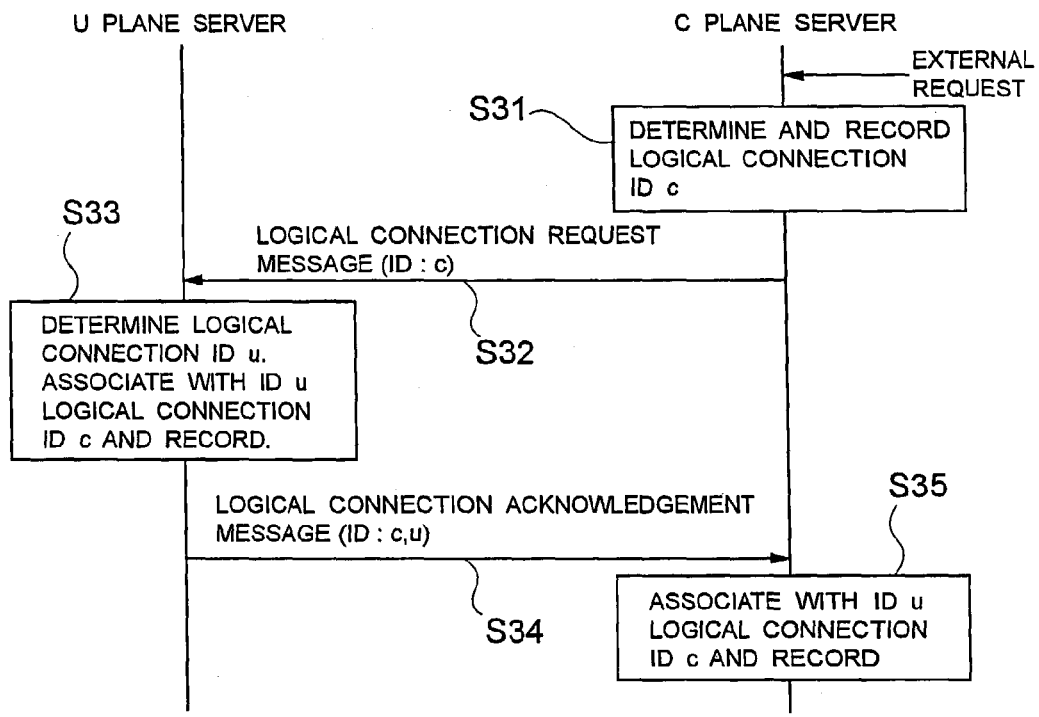
FIG. 12 is an operation sequence diagram of a logical connection setting method 4 according to the present invention.
Figure 13:
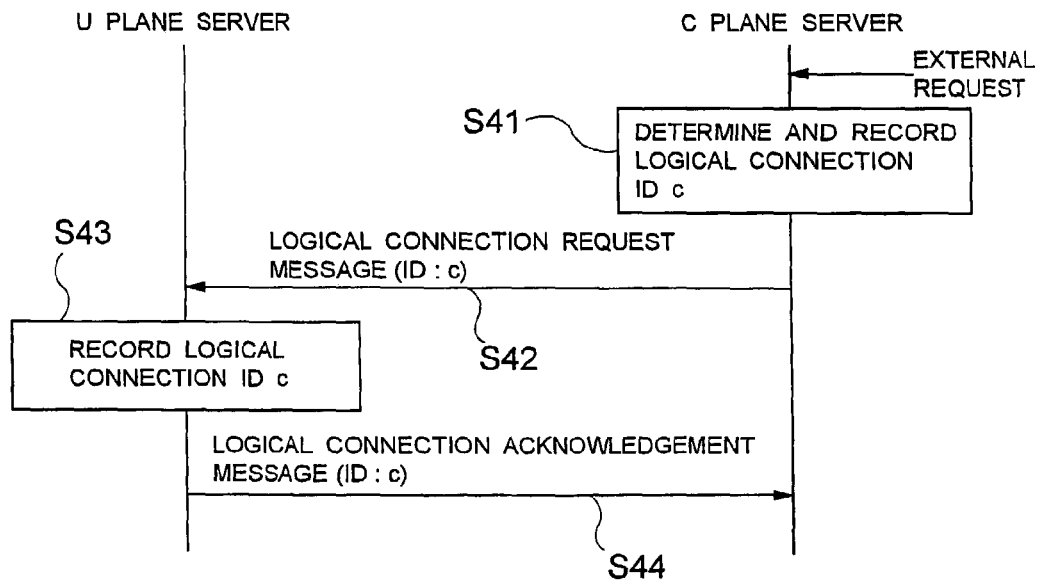
FIG. 13 is an operation sequence diagram of a logical connection setting method 5 according to the present invention.
Figure 14:
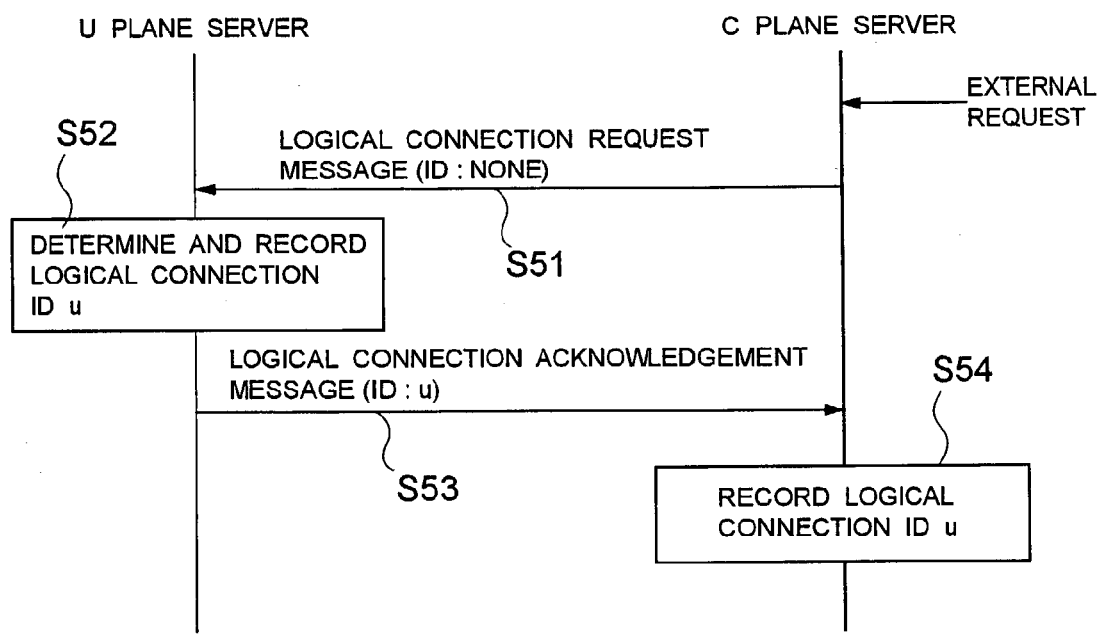
FIG. 14 is an operation sequence diagram of a logical connection setting method 6 according to the present invention.

FIGS. 12 to 14 are sequence diagrams showing logical connection configuration methods 4 to 6, and show examples in the case where the C plane server is activated first. Firstly referring to FIG. 12, when receiving the external request to transmit the signal to the mobile unit, the C plane server determines the logical connection ID(c), and associates and records therewith the mobile unit ID in the table 105 (step S31). The C plane server transmits the logical connection request message including the ID(c) to the U plane server (step S32). The U plane server having received this message determines a logical connection ID(u), and associates the ID(u) with the logical connection ID(c) determined by the C plane server and records the association in the table 206 (step S33).

The U plane server transmits the logical connection acknowledgement message including the ID(c) and the ID(u) to the C plane server (step S34). The C plane server having received this message associates the logical connection ID(c) with the ID(u)and records them in the table 105 (step S35). Consequently, the U plane server sets up radio bearer, associates an bearer ID, which is correspondent to the radio bearer, with ID(u) and records the association in the table 206.

The method 4 in FIG. 12 is one in which the C plane server is activated first and both the C plane server and the U plane server determine logical connection IDs, and corresponds to the method 1 in FIG. 9. The method 5 in FIG. 13 is one in which the C plane server is activated first and only the C plane server determines the logical connection ID(c), and corresponds to the method 2 in FIG. 10.

The method 6 in FIG. 14 is one in which the C plane server is activated first and only the U plane server determines the logical connection ID(u), and corresponds to the method 3 in FIG. 11.

The methods 4 to 6 described above are applicable in setting the logical connection in the case where a new dedicated channel is required between the mobile unit and the C plane server and no logical connection corresponding to DCCH exists between the C plane server and the U plane server.

In this case, when a DCCH setting request (corresponding to the external request) is inputted from the mobile unit to the C plane server, the C plane server transmits the logical connection request message to the U plane server, at which time the DCCH setting request includes the mobile unit ID. This DCCH setting request message is received over the logical connection coresponding to CCCH, and the above logical connection request is transmitted using the C-SAP in the foregoing description.

FIG. 19 is a system diagram showing those C plane servers (CPS) 41a to 41n and the U plane servers (UPS) 42a to 42m are interconnected, for example, over the IP network 300. In such a system, it is necessary to determine which of the C plane servers and U plane servers are involved in the setting of the logical connection. When the C plane server and the U plane server are specified, a method of setting the logical connection is inevitably determined from the methods 1 to 6 in FIGS. 9 to 14.

Methods for specifying the C plane server and the U plane server between which the logical connection is to be set, will be described. In the case where the cell is not yet set nor does the logical connection exist between the C plane server and the U plane server, and further where the U plane server transmits a cell setup request to the radio base station, the following method is employed.

For example, the U plane server 42a makes a choice according to a Cell ID between those C plane servers. The Cell ID is included in the in the Cell Setup Request. This choice is done based on the table shown in FIG. 20. When the C plane server is specified, the logical corresponding to CCCH or paging area is set according to either one of the methods 1 to 3 in FIGS. 9 to 11.

Next, in the case where a new dedicated channel is required to be set between the mobile unit and the C plane server and where no logical connection corresponding to DCCH exists between the C plane server and the U plane server, the following method is employed.

After a DCCH setting request message from the mobile unit is received by the U plane server, this request message is transmitted to the C plane server using the logical connection corresponding to CCCH. For example, the DCCH setting request message from the mobile unit belonging to a cell 1 is received by the U plane server 42a (see the table in FIG. 20), after which the request message is transmitted to the C plane server 41a using the logical connection corresponding to CCCH. The DCCH setting request message is processed at the C plane server 41a and the logical connection corresponding to DCCH is set according to either one of the methods 4 to 6 in the foregoing description.

Alternatively, the DCCH setting request message received by the C plane server 41a is transmitted from the C plane server 41a to the C plane server 41b and, the C plane server 41b establishes, the logical connection corresponding to DCCH according to either one of the methods 4 to 6. At this time, one C plane server 41 is selected from a plurality of C plane servers, which is based on the following criteria.

That is, there are some conceivable ways to select one C plane server, such that, the C plane server 41a has a correspondence table, as shown in FIG. 21, between mobile units and C plane servers based on which one C plane server is determined, or the C plane server 41a selects randomly one C plane server, or the C plane server 41a understands use status of other C plane servers by holding a table shown in FIG. 22 based on which one C plane server in non-used state is selected. Alternatively, it may be conceivable that a specific C plane server is designated as a default in advance.

While preferred embodiments have been described using specific examples for facilitating understanding of the present invention, the present invention is not limited to these embodiments, and it is to be understood that changes and modifications may be made without departing from the sprit of the invention. In addition, the present invention is preferably applicable to a W-CDMA cellular mobile communication system, however, it is obvious that the present invention is similarly applicable to other mobile communication systems.

As described above, according to the preset invention, the logical connection is set between the C plane server responsible for the control plane and the U plane server responsible for the user plane, so that the function responsible for the control plane and the function responsible for the user plane which are conventionally configured integrally can physically be separated from each other, which allows the function of only one control plane to control functions of a plurality of user planes, thus efficiently enhancing the expandability and flexibility.

Furthermore, such separation of both the functions raises the necessity of setting the logical connection between the C plane server and the U plane server, since a function part responsible for the control plane needs to utilize the radio bearer prepared by a function part responsible for the user plane when providing the control plane information to the mobile unit. At this time, if the U plane server does not recognize the correspondence between logical connections and radio bearers, it is not able to provide the signal to an appropriate mobile unit. In the present invention, the logical connection is assigned with an identifier to be able to manage recognizably the correspondence between logical connections and mobile units or radio bearers, which enables providing the signal for the mobile unit appropriately, and further enables coping flexibly with a change of the network system.

The flexibility to a change of the network system is realized because the header does not contain information representing a user (mobile unit) id, radio bearer id, or the like, which thus provides an advantage such that, for example, even when the data length of the id indicating a user is changed, a functional change in connection with the logical connection is made only for the size of a table (e.g., FIG. 15).

What is claimed is:

1. A mobile communication system which includes a mobile unit, a radio base station apparatus, and a radio network controller,
    the radio network controller comprises:
    user plane controlling means for carrying user data in relation to the mobile unit; and
    control plane controlling means for controlling signaling, the control plane controlling means being physically separated from the user plane controlling means, and
    in response to an external request, setting of a logical connection is controlled between the control plane controlling means and the user plane controlling means by using a logical connection identifier to indicate the logical connection among a logical connection group,
    wherein the logical connection controlled between the control plane controlling means and the user plane controlling means is further providing a direct connection between a transport network layer and a radio network layer in the mobile communication system.

2. The mobile communication system according to claim 1, wherein
    the external request includes a transmission destination identifier indicating a destination of signal that the control plane controlling means transmits in response to the external request,
    at least either one of the control plane controlling means and the user plane controlling means comprises means for determining the logical connection identifier in response to the external request, and
    each of the control plane controlling means and the user plane controlling means comprises means for generating a logical connection corresponding to the logical connection identifier.

3. The mobile communication system according to claim 1, wherein
    the control plane controlling means comprises means for associating the logical connection identifier with the transmission destination identifier and recording the association, and
    the user plane controlling means comprises means for associating the logical connection identifier with an identifier of a radio bearer to carry the signal and recording the association.

4. The mobile communication system according to claim 1, wherein both of the control plane controlling means and the user plane controlling means comprise means for adding a header including the logical connection identifier to the signal and transmitting the resultant information over the logical connection,
    and both of the control plane controlling means and the user plane controlling means also comprise means for receiving the information over the logical connection, removing the header from data via the logical connection,
    and the user plane controlling means also comprises means for transmitting the signal to the mobile unit via the radio bearer.

5. The mobile communication system according to claim 1, wherein the logical connection is assigned to a common channel or a dedicated channel.

6. The mobile communication system according to claim 2, wherein
    the user plane controlling means comprises means for generating a first identifier for the logical connection in response to the external request and transmitting a logical connection request message including the first identifier and the transmission destination identifier to the control plane controlling means,
    the control plane controlling means comprises means for generating a second identifier corresponding to the first identifier and transmitting a logical connection acknowledgement message including the first and second identifiers to the user plane controlling means, and means for recording the first and second identifiers, and the transmission destination identifier with their being associated with one another, and the user plane controlling means further comprises means for setting a radio bearer, between the transmission destination and
    the user plane controlling means, corresponding to the logical connection, and means for recording the first and second identifiers, and an identifier of the radio bearer with their being associated with one another.

7. The mobile communication system according to claim 2, wherein
    the user plane controlling means comprises means for generating the logical connection identifier in response to the external request and transmitting a logical connection request message including the logical connection identifier and the transmission destination identifier to the control plane controlling means,
    the control plane controlling means comprises means for transmitting a logical connection acknowledgement message including the logical connection identifier to the user plane controlling means, and means for recording the logical connection identifier and the transmission destination identifier with their being associated with each other, and the user plane controlling means further comprises means for setting a radio bearer corresponding to the logical connection, and means for recording the logical connection identifier and an identifier of the radio bearer with their being associated with each other.

8. The mobile communication system according to claim 2, wherein the user plane controlling means comprises means for transmitting a logical connection request message including the transmission destination identifier to the control plane controlling means in response to the external request, the control plane controlling means comprises means for generating the logical connection identifier and transmitting a logical connection acknowledgement message including the logical connection identifier to the user plane controlling means, and means for recording the logical connection identifier and the transmission destination identifier with their being associated with each other, and the user plane controlling means further comprises means for setting a radio bearer, corresponding to the logical connection, and means for recording the logical connection identifier and an identifier of the radio bearer with their being associated with each other.

9. The mobile communication system according to claim 2, wherein the control plane controlling means comprises means for generating a first identifier for the logical connection in response to the external request and transmitting a logical connection request message including the first identifier to the user plane controlling means, the user plane controlling means comprises means for generating a second identifier corresponding to the first identifier and transmitting a logical connection acknowledgement message including the first and second identifiers to the control plane controlling means, means for setting a radio bearer, corresponding to the logical connection, and means for recording the first and second identifiers, and an identifier of the radio bearer with their being associated with one another, and the control plane controlling means further comprises means for recording the first and second identifiers and the transmission destination identifier with their being associated with one another.

10. The mobile communication system according to claim 2, wherein the control plane controlling means comprises means for generating the logical connection identifier in response to the external request and transmitting a logical connection request message including the logical connection identifier to the user plane controlling means, the user plane controlling means comprises means for transmitting a logical connection acknowledgement message including the logical connection identifier to the control plane controlling means, means for setting a radio bearer, corresponding to the logical connection, and means for recording the logical connection identifier and an identifier of the radio bearer with their being associated with each other, and the control plane controlling means further comprises means for recording the logical connection identifier and the transmission destination identifier with their being associated with each other.

11. The mobile communication system according to claim 2, wherein the control plane controlling means comprises means for transmitting a logical connection request message to the user plane controlling means in response to the external request, the user plane controlling means comprises means for generating the logical connection identifier and transmitting a logical connection acknowledgement message including the logical connection identifier to the control plane controlling means, means for setting a radio bearer, corresponding to the logical connection, and means for recording the logical connection identifier and an identifier of the radio bearer with their being associated with each other, and the control plane controlling means further comprises means for recording the logical connection identifier and the transmission destination identifier with their being associated with each other.

12. A method of controlling operation in a mobile communication system which includes user plane controlling means for carrying user data in relation to a mobile unit and control plane controlling means for controlling signaling, the control plane controlling means being physically separated from the user plane controlling means, the method comprising:

a step of setting and controlling a logical connection between the control plane controlling means and the user plane controlling means by using a logical connection identifier to indicate the logical connection among a logical connection group in response to an external request, wherein the step of setting and controlling a logical connection between the control plane controlling means and the user plane controlling means further comprises setting a direct logical connection between a transport network layer and a radio network layer in the mobile communication system.

13. The method of controlling operation according to claim 12, further comprising:

in at least either one of the control plane controlling means and the user plane controlling means, a step of determining the logical connection identifier in response to the external request; and in each of the control plane controlling means and the user plane controlling means, a step of generating a logical connection corresponding to the logical connection identifier, wherein the external request includes a transmission destination identifier indicating a transmission destination to which control plane information is to be transmitted.

14. The method of controlling operation according to claim 12, further comprising:

in the control plane controlling means, a step of recording the logical connection identifier and the transmission destination identifier with their being associated with each other; and in the user plane controlling means, a step of recording the logical connection identifier and an identifier of a radio bearer with the identifiers being associated with each other.

15. The method of controlling operation according to claim 12, further comprising:

in each of the control plane controlling means and the user plane controlling means, a step of adding a header including the logical connection identifier to the signal and transmitting the resultant information over the logical connection.

16. The method of controlling operation according to claim 12, wherein the logical connection is assigned to a common channel or a dedicated channel.

17. The method of controlling operation according to claim 12, further comprising:
in the user plane controlling means,
a step of generating a first identifier for the logical connection in response to the external request, and
a step of transmitting a logical connection request message including the first identifier and the transmission destination identifier to the control plane controlling means;
in the control plane controlling means,
a step of generating a second identifier corresponding to the first identifier,
a step of transmitting a logical connection acknowledgement message including the first and second identifiers to the user plane controlling means, and
a step of recording the first and second identifiers and the transmission destination identifier with their being associated with one another; and
in the user plane controlling means, a step of setting a radio bearer, corresponding to the logical connection, and
a step of recording the first and second identifiers and an identifier of the radio bearer with their being associated with one another.

18. The method of controlling operation according to claim 12, further comprising:
in the user plane controlling means,
a step of generating the logical connection identifier in response to the external request, and
a step of transmitting a logical connection request message including the logical connection identifier and the transmission destination identifier to the control plane controlling means;
in the control plane controlling means,
a step of transmitting a logical connection acknowledgement message including the logical connection identifier to the user plane controlling means, and
a step of recording the logical connection identifier and the transmission destination identifier with their being associated with each other; and
in the user plane controlling means,
a step of setting a radio bearer, between the transmission destination and the user plane controlling means, corresponding to the logical connection, and
a step of recording the logical connection identifier and an identifier of the radio bearer with their being associated with each other.

19. The method of controlling operation according to claim 12, further comprising:
in the user plane controlling means,
a step of transmitting a logical connection request message including the transmission destination identifier to the control plane controlling means in response to the external request;
in the control plane controlling means,
a step of generating the logical connection identifier, a step of transmitting a logical connection acknowledgement message including the logical connection identifier to the user plane controlling means, and
a step of recording the logical connection identifier and the transmission destination identifier with their being associated with each other; and
in the user plane controlling means,
a step of setting a radio bearer, between the transmission destination and the user plane controlling means, corresponding to the logical connection, and
a step of recording the logical connection identifier and an identifier of the radio bearer with their being associated with each other.

20. The method of controlling operation according to claim 12, further comprising:
in the control plane controlling means,
a step of generating a first identifier for the logical connection in response to the external request, and
a step of transmitting a logical connection request message including the first identifier to the user plane controlling means;
in the user plane controlling means,
a step of generating a second identifier corresponding to the first identifier,
a step of transmitting a logical connection acknowledgement message including the first and second identifiers to the control plane controlling means,
a step of setting a radio bearer corresponding to the logical connection between the transmission destination and the user plane controlling means, and
a step of recording the first and second identifiers and an identifier of the radio bearer with their being associated with one another;
and in the control plane controlling means,
a step of recording the first and second identifiers and the transmission destination identifier with their being associated with one another.

21. The method of controlling operation according to claim 12, further comprising:
in the control plane controlling means,
a step of generating the logical connection identifier in response to the external request, and
a step of transmitting a logical connection request message including the logical connection identifier to the user plane controlling means;
in the user plane controlling means,
a step of transmitting a logical connection acknowledgement message including the logical connection identifier to the control plane controlling means,
a step of setting a radio bearer corresponding to the logical connection between the transmission destination and the user plane controlling means, and
a step of recording the logical connection identifier and an identifier of the radio bearer with their being associated with each other; and
in the control plane controlling means, a step of recording the logical connection identifier and the transmission destination identifier with their being associated with each other.

22. The method of controlling operation according to claim 12, further comprising:
in the control plane controlling means,
a step of transmitting a logical connection request message to the user plane controlling means in response to the external request;
in the user plane controlling means,
a step of generating the logical connection identifier,
a step of transmitting a logical connection acknowledgement message including the logical connection identifier to the control plane controlling means,
a step of setting a radio bearer, between the transmission destination and the user plane controlling means, corresponding to the logical connection, and
a step of recording the logical connection identifier and an identifier of the radio bearer with their being associated with each other; and
in the control plane controlling means, a step of recording the logical connection identifier and the transmission destination identifier with their being associated with each other.

23. A mobile communication system which includes a mobile unit, a radio base station apparatus, and a radio network controller, the radio network controller comprises:

user plane controlling means for carrying user data in relation to the mobile unit; and control plane controlling means for controlling signaling, the control plane controlling means being physically separated from the user plane controlling means, and in response to an external request, setting of a logical connection is controlled between the control plane controlling means and the user plane controlling means by using a logical connection identifier to indicate the logical connection among a logical connection group, wherein the external request includes a transmission destination identifier indicating a destination of signal that the control plane controlling means transmits in response to the external request, at least either one of the control plane controlling means and the user plane controlling means comprises means for determining the logical connection identifier in response to the external request, and each of the control plane controlling means and the user plane controlling means comprises means for generating a logical connection corresponding to the logical connection identifier, the user plane controlling means comprises means for generating a first identifier for the logical connection in response to the external request and transmitting a logical connection request message including the first identifier and the transmission destination identifier to the control plane controlling means, the control plane controlling means comprises means for generating a second identifier corresponding to the first identifier and transmitting a logical connection acknowledgement message including the first and second identifiers to the user plane controlling means, and means for recording the first and second identifiers, and the transmission destination identifier with their being associated with one another, and the user plane controlling means further comprises means for setting a radio bearer, between the transmission destination and the user plane controlling means, corresponding to the logical connection, and means for recording the first and second identifiers, and an identifier of the radio bearer with their being associated with one another.

* * * * *

UNITED STATES PATENT AND TRADEMARK OFFICE
CERTIFICATE OF CORRECTION

PATENT NO. : 7,626,971 B2  Page 1 of 1
APPLICATION NO. : 10/460262
DATED : December 1, 2009
INVENTOR(S) : Satoshi Noma It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1320 days.

Signed and Sealed this

Twenty-first Day of December, 2010

David J. Kappos
*Director of the United States Patent and Trademark Office*